United States Patent [19]
Frey et al.

[11] Patent Number: 5,337,439
[45] Date of Patent: Aug. 16, 1994

[54] HEADLAMP CLEANING UNIT FOR THE FRONT AREA OF A MOTOR VEHICLE

[75] Inventors: Wolfram Frey, Althengstett; Hans Trube, Herrenberg, both of Fed. Rep. of Germany

[73] Assignee: Mercedes-Benz AG, Stuttgart, Fed. Rep. of Germany

[21] Appl. No.: 798,087

[22] Filed: Nov. 27, 1991

[30] Foreign Application Priority Data

Nov. 27, 1990 [DE] Fed. Rep. of Germany ....... 4037707

[51] Int. Cl.$^5$ ................ B60S 1/18; B60S 1/34; B60S 1/06
[52] U.S. Cl. ................ 15/250.002; 15/250.31; 15/250.30; 403/DIG. 3
[58] Field of Search .......... 15/250.002, 250.31, 15/250.34, 250.001, 250.003, 250.30; 403/DIG. 3, DIG. 4, 263, 241

[56] References Cited

U.S. PATENT DOCUMENTS

| 3,456,278 | 7/1969 | Mandy et al. ............. 15/250.002 |
| 4,507,711 | 3/1985 | Ono et al. ................ 15/250.31 |

FOREIGN PATENT DOCUMENTS

| 0097365 | 10/1986 | European Pat. Off. . |
| 7121211 | 5/1971 | Fed. Rep. of Germany . |
| 842355 | 3/1939 | France ............... 15/250.31 |
| 845059 | 5/1939 | France ............... 15/250.31 |
| 2235593 | 1/1975 | France . |
| 2245192 | 4/1975 | France ............... 15/250.002 |

*Primary Examiner*—Timothy F. Simone
*Assistant Examiner*—Gary K. Graham
*Attorney, Agent, or Firm*—Evenson, McKeown, Edwards & Lenahan

[57] ABSTRACT

A vehicle headlamp wiper apparatus having a wiper shaft which projects longitudinally outward from a housing toward the front of the vehicle. A locking device which axially fixes the shaft against longitudinal displacement relative to the housing is designed to release the shaft, and allow longitudinal displacement upon application of a longitudinal load of predetermined magnitude.

4 Claims, 2 Drawing Sheets

HEADLAMP CLEANING UNIT FOR THE FRONT AREA OF A MOTOR VEHICLE

BACKGROUND AND SUMMARY OF THE INVENTION

The invention relates to a headlamp cleaning unit for the front area of a motor vehicle. A headlamp wiper is arranged on a driven shaft which is mounted in a housing in an axially fixed manner. The longitudinal axis of the shaft runs approximately parallel to the longitudinal axis of the vehicle, and one end face of the shaft, at the front side of the vehicle, projects beyond the drive housing.

Such headlamp cleaning units are generally known (also see Bosch-kraftfahrtechnisches Handbuch, 20th edition, VDI Verlag, Düsseldorf, 1987). If the motor vehicle strikes an obstacle even at a low speed (for example at most 4 km per hour), the shaft can be thrust to the rear by the force acting axially on its end face, which can damage the drive housing. If the wiper shaft is fixed to the headlamp itself, the headlamp will also be damaged.

In a passenger car having swing-in headlamps, it is also known (EP-B 0, 097,365) to arrange the headlamp cleaning unit rigidly on each headlamp so that is can be swung in and out together with the headlamps. Consequently, although the shaft driving the wiper is movable relative to the front area of the vehicle, it is still rigidly arranged on the headlamp itself.

The object of the invention is to provide a headlamp cleaning unit of the above-mentioned type, in which damage to the wiper drive caused by the shaft in the event of a front collision at low speed is avoided.

This object is achieved according to the invention in which a locking device which axially fixes the shaft is designed to release the shaft for axial movement if an axial load occurs which exceeds a predetermined value. With the shaft no longer axially fixed with respect to such an axial load on its end face projecting to the front, it can be displaced to the rear so that the drive housing and other elements of the wiper drive or of the headlamps cannot be damaged.

In a preferred embodiment of the invention, the locking device is elastically deformable- It is thereby possible, for example after an impact, to return the shaft from its axially displaced position into its operating position in which the locking device axially fixes the shaft again.

In another preferred embodiment of the invention, a cap is arranged on the rear (in the direction of the load) end of the shaft projecting out of the housing, which cap is held by means of catch lugs in corresponding catch locations of a rear opening of the housing- This cap serves the dual purposes of axially fixing the shaft in the housing, and transmitting the cleaning water to the headlamp unit.

Other objects, advantages and novel features of the present invention will become apparent from the following detailed description of the invention when considered in conjunction with the accompanying drawings.

DETAILED DESCRIPTION OF THE DRAWINGS

Figure 1:
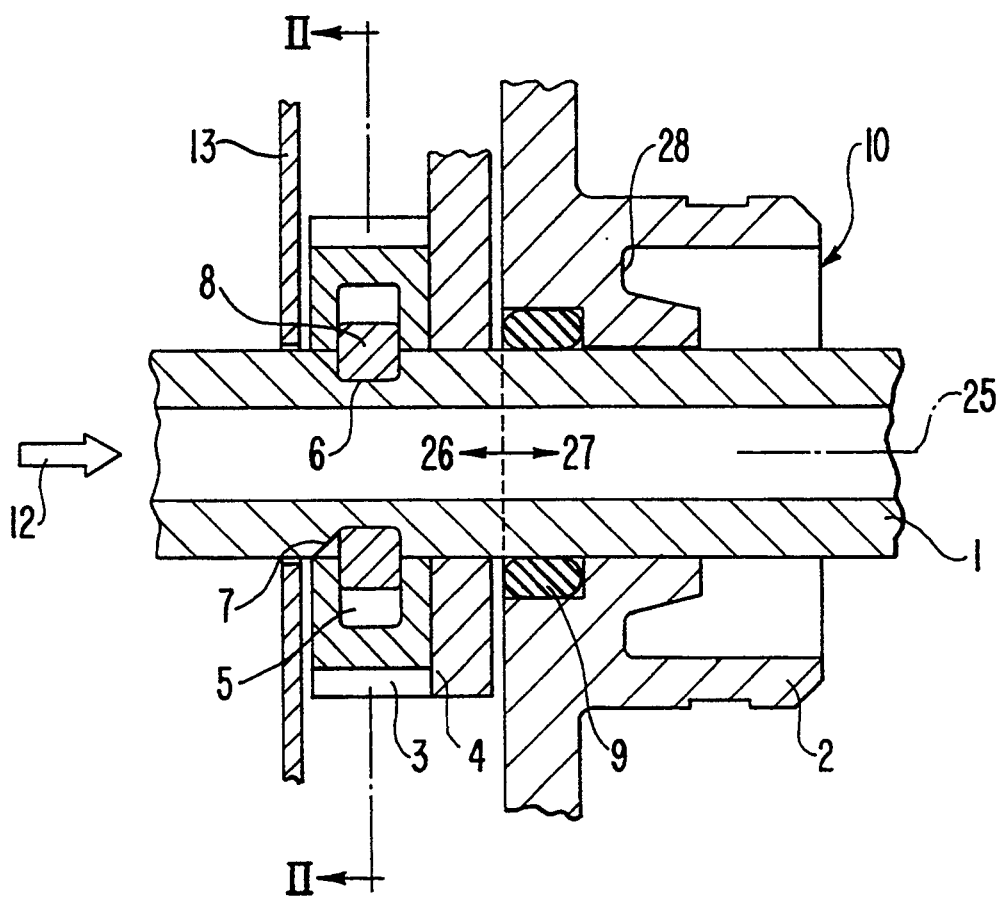
FIG. 1, in a sectional view, shows a detail of an embodiment of a drive housing of a headlamp cleaning unit according to the invention.

Referring to FIG. 1, a headlamp cleaning unit has a wiper blade (not shown) which in an oscillating movement cleans a front glass (not shown) of a headlamp in a front area of a passenger car, in a known manner. The wiper blade is arranged on a wiper lever 4 which is held on a shaft 1 in a positive-locking manner in the peripheral direction. This shaft 1 is driven by an electric motor via gearing. The shaft 1 and the motor are normally arranged in a common drive housing 2 which is fastened in the front area of the passenger car. The arrangement and construction of such headlamp cleaning units are essentially known.

In FIG. 1, the shaft 1 is arranged in the housing 2 in such a way that its longitudinal axis 25 runs essentially parallel to the longitudinal axis of the vehicle and thus essentially perpendicularly to the headlamp plane. The front side of the housing 2 (relative to the travelling direction of the passenger car) is limited by a bearing plate 13, and the rear side of the housing 2 is limited by a connection part 10. The shaft 1 projects on either side beyond the housing 2 through corresponding openings in the bearing plate 13 and the connection part 10 respectively- Shaft 1 is hollow, and is subdivided into two sections 26 and 27 indicated by a broken line. The section 26 has an essentially square outer contour, as apparent from FIG. 2, while the section 27 is provided with a smaller cylindrical outer contour.

Between the bearing plate 13 and the rear wall of the housing 2, a pinion 3 is arranged on the shaft for drive transmission, which pinion 3 is part of worm gearing (not show) connected to the motor. Arranged next to the pinion 3 on the shaft 1 is the wiper lever 4, which projects up through the housing 2 and is connected to the wiper blade. Both pinion 3 and the lever 4 sit with clearance in the axial direction on the shaft 1 and move positively with the shaft merely in the peripheral direction on account of the square outer contour of the section 26. The pinion 3 and the lever 4 sit with slight axial clearance between the bearing plate 13 and the rear wall of the housing 2, and are therefore axially fixed with regard to the housing 2. The square surfaces 21 of the section 26 of the shaft 1 enable the pinion 3 to cause the shaft 1 (and consequently lever 4) to execute the appropriate pivoting and rotary movement. Gear 3 and lever 4 may also be a single piece, since they are fixed anyway in the peripheral direction by the square surfaces 21 of the shaft 1. In the area of the section 27 of the shaft 1, an O-ring 9 of elastomeric material is provided between the shaft 1 and the housing 2 in order to seal off the interior of the housing 2 from spray water or dirt. A cap, for example similar to FIG. 3 (described below), serves to seal off the opening of the connection part 10. However, for reasons of clarity the cap is not shown in FIG. 1.

Figure 2:
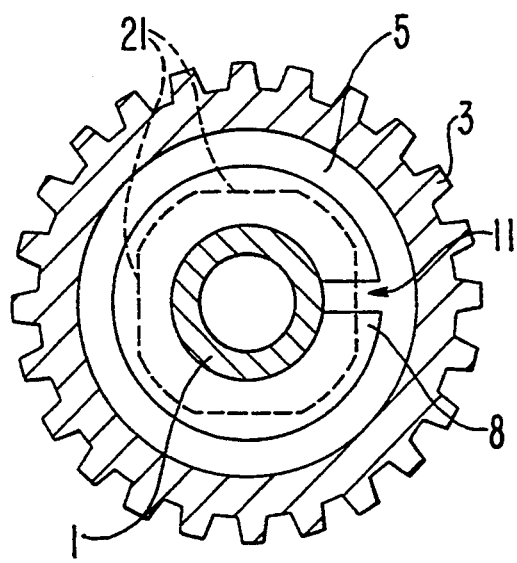
FIG. 2 shows a section along II—II through the locking device according to FIG. 1.

The shaft 1 is axially secured in the housing 2 by a disc-shaped snap ring 8 which is provided with a slit 11, as apparent from FIG. 2. This snap ring 8 is held concentrically to the axis 25 in an annular groove 6 of the shaft 1 and projects above the periphery of the shaft 1, engaging in a corresponding annular groove 5 of the pinion 3. On its side facing the bearing plate 13, the annular groove 6 is provided with an encircling sloping stop surface 7. If an axial load, for example caused by a front collision of the motor vehicle, is applied to the shaft 1 in the direction of arrow 12, this truncated-cone-shaped sloping stop surface 7 acts as a wedge on the snap ring 8 and pushes the latter apart, while the shaft 1 is displaced axially to the rear. The depth of the annular groove 5 in the pinion 3 has such a dimension that there is sufficient space for the expansion of the snap ring 8. The snap ring 8 deforms elastically- The length of the section 26 of the shaft i is such that the shaft 1 can be displaced to the rear out of the housing 2 in the direction of the load (arrow 12) by about 50 mm relative to the snap ring 8. In order to return the shaft 1 from this displaced position back into its operating position, it is pushed forward until the snap ring 8 again snaps into the annular groove 6 of the shaft 1. Damage to the housing 2 is avoided by this release of the axial fixing arrangement.

Figure 3:
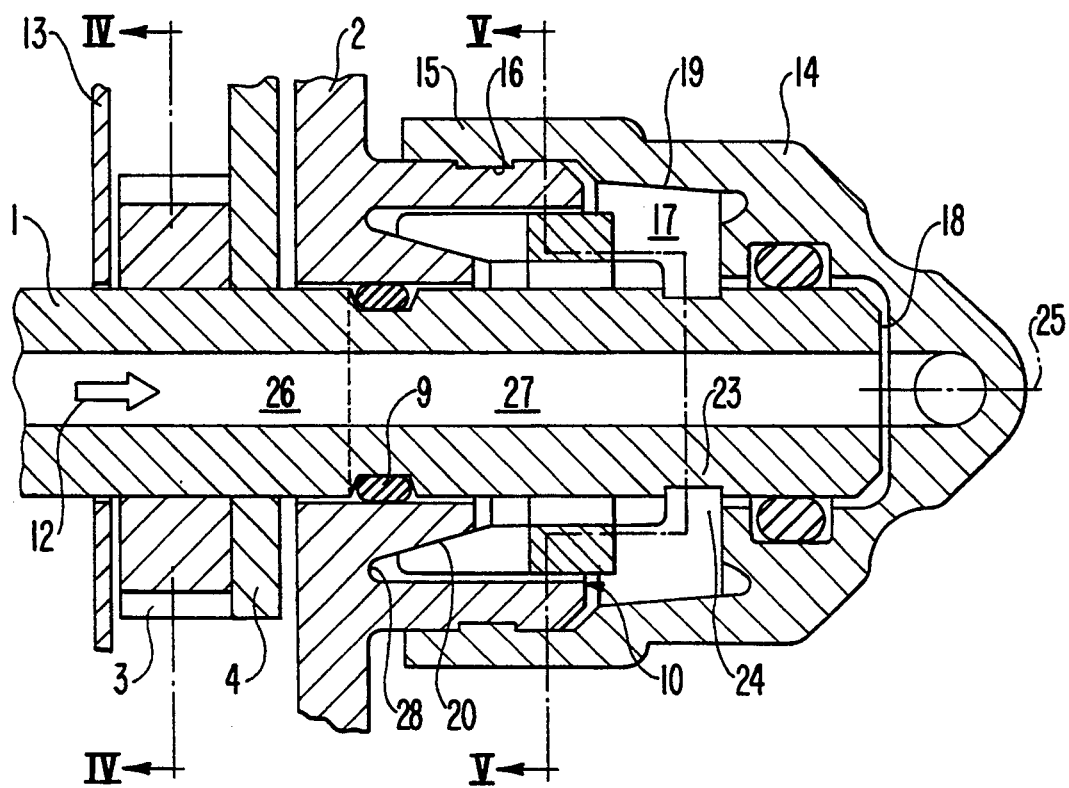
FIG. 3, in a sectional view, shows a detail of a further embodiment of a headlamp cleaning unit in which a cap is put onto the end of the shaft projecting through a rear housing opening.
Figure 4:
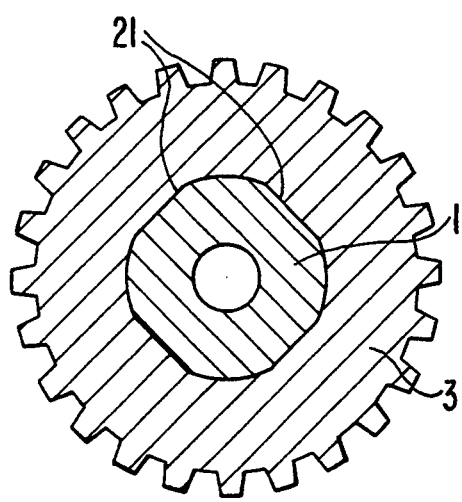
FIG. 4 shows a section along line IV—IV through the pinion, driving the shaft, in FIG. 3.

In the embodiment according to FIG. 3, the end face 18 of the shaft 1 opposite the point of impact of the load (arrow 12), is provided with a cap 14 which serves to axially fix the shaft 1 in its operating position. The shaft 1—as in the embodiment in FIG. 1—is provided with two sections 26 and 27, the section 26, as apparent from FIG. 4, being provided with square o surfaces 21 at its periphery. In the smaller cylindrical section 27, an annular groove 23 is provided in the shaft 1, in which lugs 24 of an expanding ring 17 surrounding the shaft 1 engage. The expanding ring 17 extends essentially cylindrically against the load direction (arrow 12) into the opening of the connection part 10 of the housing 2. The opening is provided with an annular-groove-shaped recess which is concentric to the axis 25 and whose inside widens in a truncated-cone shape relative to the axis 25 towards the root 28 of the opening. A sloping stop surface 20 is thereby formed for the expanding ring 17 which in turn is provided with strap-like extensions which engage in the recess. These extensions have sloping stop surfaces corresponding to the sloping stop surface 20 of the recess. The expanding ring 17 is pressed by the cap 14 into the recess and held there in an axially fixed manner. Consequently, the expanding ring 17 centers the shaft 1 in respect of its axis 25 inside the opening 10. This secures the exact orientation of the shaft 1 with regard to the housing 2. For this purpose, the cap 14, on its inside, is provided with a step which acts on the end face of the expanding ring 17 opposite the extensions. Nonetheless, to enable the shaft 1 to perform a rotary or pivoting movement, the expanding ring 17, with its lugs 24, sits with clearance in the annular groove 23 of the shaft. The cap 14 is clipped onto the connection part 10 of the housing 2. For this purpose, the outside of the connection part 10 is provided with an annular groove 16 which is concentric to the axis 25 and in which an annular collar 15 on the inside of the cap 14 engages. The cap 14 is thereby held on the housing 2, and the shaft 1 is also axially fixed by means of the fixing arrangement of the expanding ring 17. In order to avoid the ingress of spray water and dirt particles even in the area of the end face of the shaft 1 facing the cap 14, a further O-ring is arranged in this area on the shaft 1.

Figure 5:
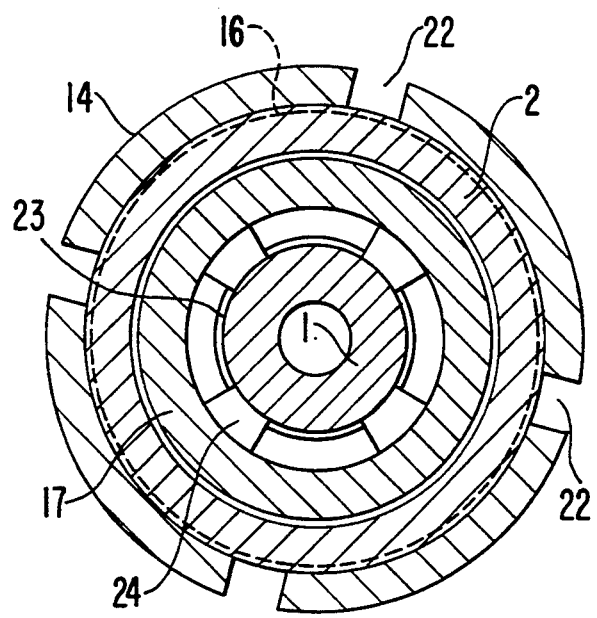
FIG. 5 shows a section along line V—V in FIG. 3 through the drive housing in the area of the rear opening of the housing.

If an axial load is now applied to the shaft 1 in the direction of the arrow 12, the expanding ring 17 or the end face 18 of the shaft 1 presses the cap 14 out of its clipped arrangement with the housing 2 so that the shaft 1, with the expanding ring 17 and cap 14, can be displaced axially to the rear. In order to move the shaft 1 back into its operating position, the shaft 1, together with the expanding ring 17, is pushed back again into its operating position and then the cap 4 is clipped onto the housing 2 again. So that the cap 14 can elastically deform in the area of its annular collar 15 permitting it to engage and disengage with annular groove 16 on the housing 2 during the clipping action, it is provided with axial longitudinal slots 22 (FIG. 5) which run into the cap 14 from the end face of the latter facing the housing 2.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Headlamp cleaning apparatus for a front area of an elongated motor vehicle comprising:
   a headlamp wiper assembly for cleaning a headlamp;
   a driven shaft on which said headlamp wiper assembly is nonrotatably mounted;
   a housing having an opening in which said shaft is mounted, with a longitudinal axis of said shaft running approximately parallel to a longitudinal axis of said vehicle and with an end face of said shaft projecting from said housing toward a front end of said vehicle; and
   locking apparatus for axially fixing said shaft to prevent axial displacement thereof relative to said housing, and
   for releasing said shaft upon application to the shaft of an axial load which exceeds a predetermined magnitude, to permit axial displacement of the shaft in a direction of said axial load;
   wherein said locking apparatus comprises a cap coupled on a rear end relative to the direction of the load, of the shaft projecting out of the housing, which cap is held on said housing by means of catch lugs which engage with a corresponding catch groove on a rear opening of the housing.

2. Headlamp cleaning apparatus according to claim 1, wherein the locking apparatus comprises an elastically deformable member.

3. Headlamp cleaning apparatus according claim 1, wherein a plastic expanding ring axially centering the shaft in the housing opening is provided on the shaft.

4. Headlamp cleaning apparatus according claim 2, wherein a plastic expanding ring axially centering the shaft in the opening of the housing is provided on the shaft.

* * * * *